Aug. 28, 1962    P. B. HARTUPEE    3,051,020
LOCKING DIFFERENTIAL WITH PRESSURE RELIEF DEVICE
Filed Feb. 16, 1959    3 Sheets-Sheet 1
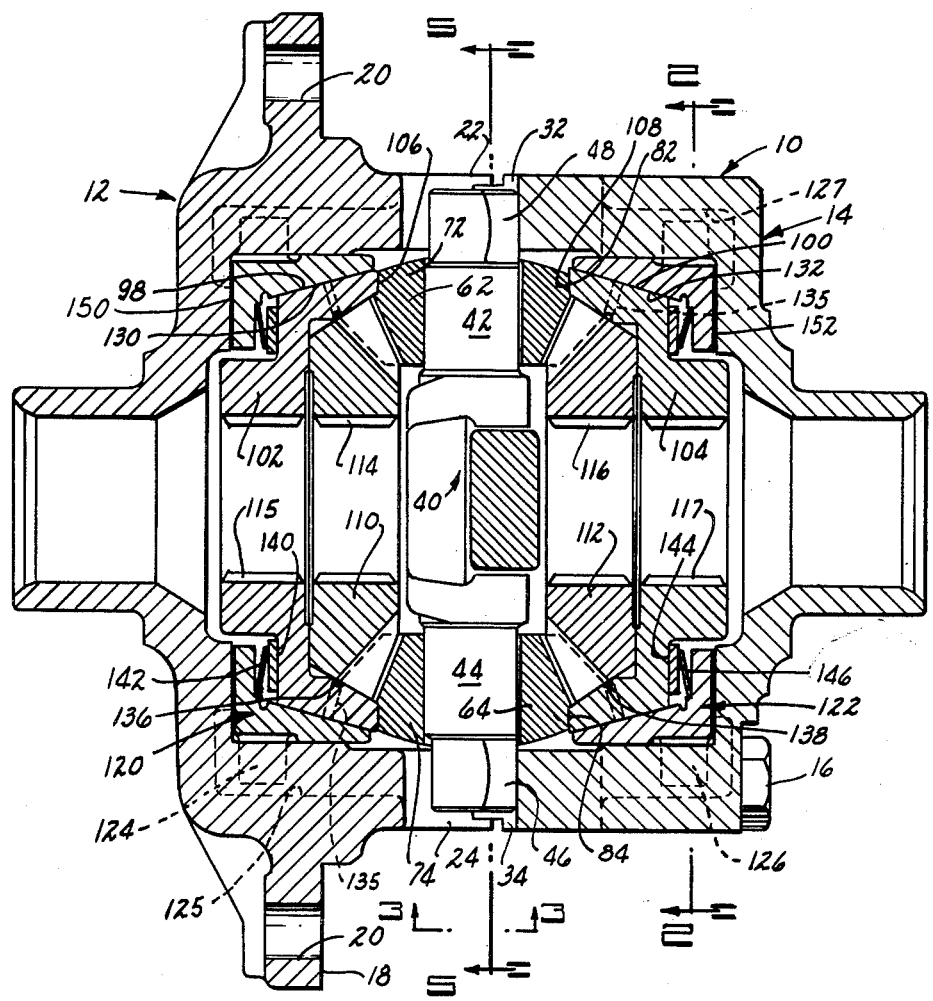
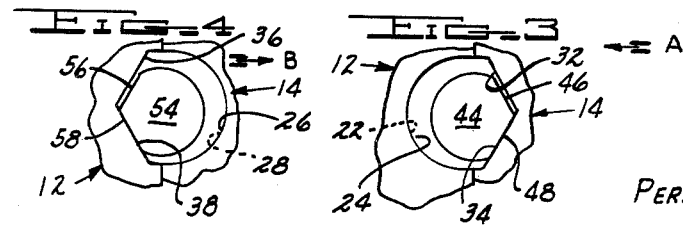
INVENTOR
PERRY B. HARTUPEE
KOTTS & SHERIDAN
ATTORNEYS

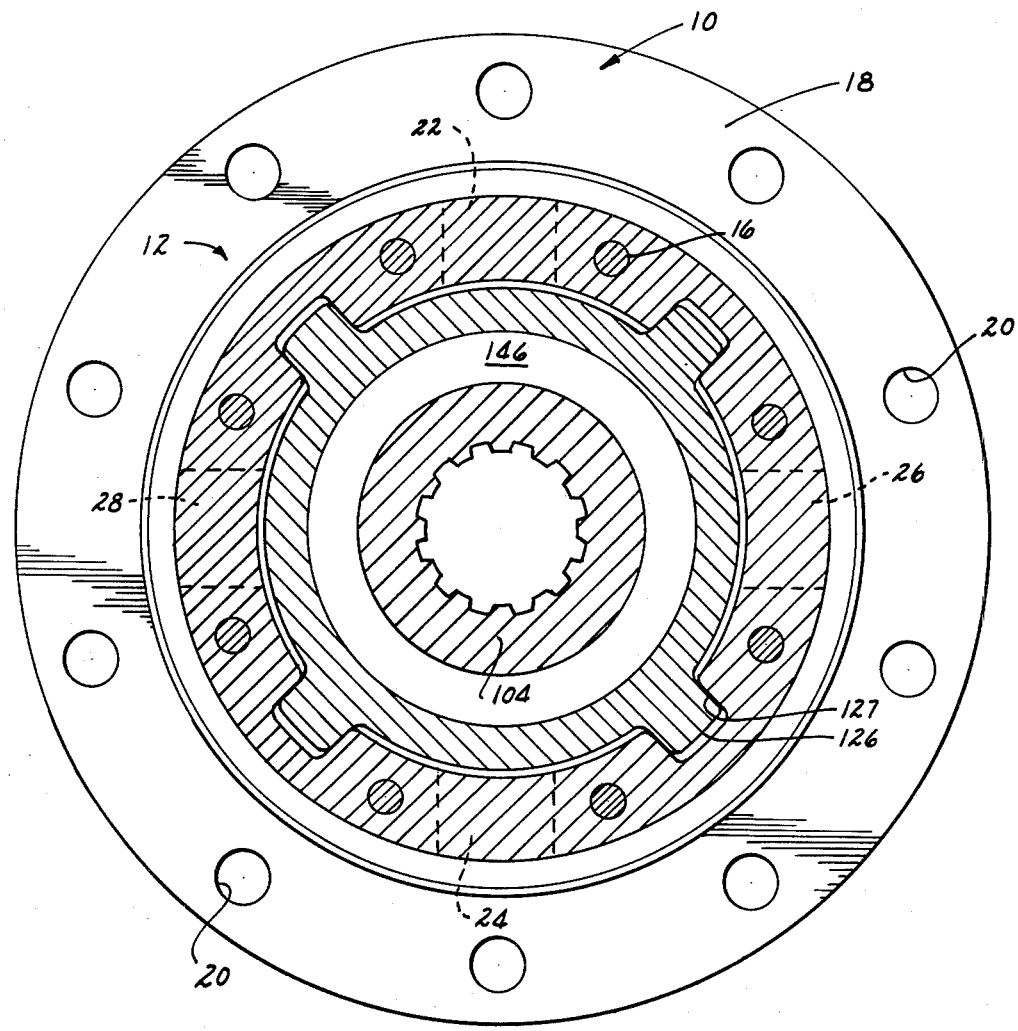

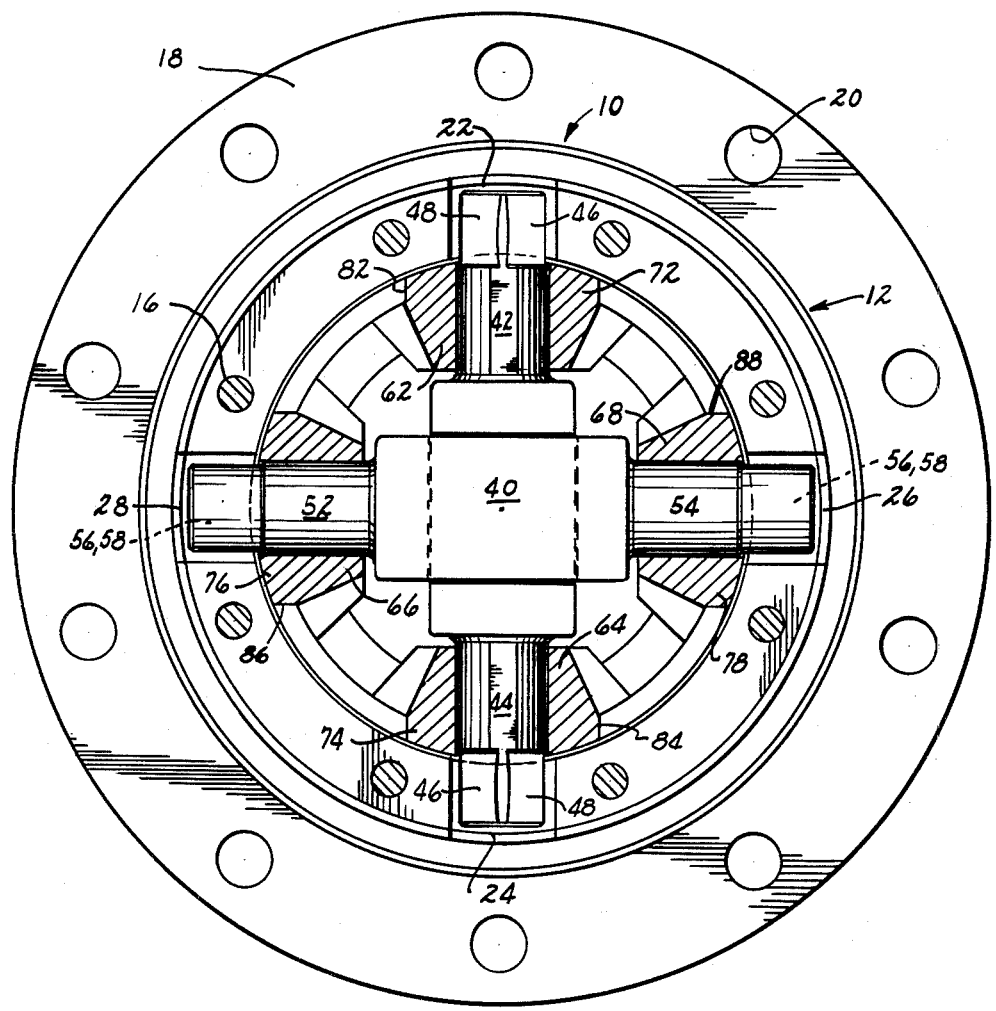

United States Patent Office 3,051,020
Patented Aug. 28, 1962

3,051,020
LOCKING DIFFERENTIAL WITH PRESSURE RELIEF DEVICE
Perry B. Hartupee, Dearborn, Mich., assignor to Thornton Axle Inc., Detroit, Mich.
Filed Feb. 16, 1959, Ser. No. 793,471
3 Claims. (Cl. 74—710.5)

The present invention relates to improvements in a locking differential power transmission.

The differential power transmission is probably best known for its use in wheeled vehicles such as automobiles. The present invention is concerned with such a device, wherein one wheel cannot slip or run away when it encounters a surface providing poor traction. This type device is known as a locking differential.

Throughout the years many types of locking differentials have been proposed, and locking has been accomplished in a variety of ways. Most of the friction type locking differentials are inefficient and have difficulty in performing the proper differential function when the vehicle is moving around a corner. This difficulty occurs because the normal tendency to lock the differential must be overcome when the device performs its differential function in cornering. Even those devices designed to provide a neutral or unlocked condition for differentialing around corners have difficulty because of this tendency to lock.

It is a principal object of the present invention to provide an improved locking differential wherein unlocking is readily and automatically provided when the device is required to perform the differential function.

It is another object of the present invention to provide such a locking differential which is simple, durable, and of such design as to be economically manufactured in quantity by modern mass production methods.

Other objects of this invention will appear in the following description and appended claims, reference being had to the accompanying drawings forming a part of this specification wherein like reference characters designate corresponding parts in the several views.

In the drawings:

FIG. 1 is a vertical cross-section of the locking differential embodying the present invention.

FIG. 2 is a cross-sectional view taken generally on lines 2—2 of FIG. 1.

FIG. 3 is an end elevational view of a spider pin end taken generally along lines 3—3 of FIG. 1 showing a first set of cam faces.

FIG. 4 is a view similar to FIG. 3 showing a second set of cam faces on a second spider pin stub shaft end.

FIG. 5 is a cross-sectional view taken generally on lines 5—5 of FIG. 1,

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the differential shown is generally of the floating spider pin type invented by Ray F. Thornton. It comprises a case 10 which is formed by two separable sections 12 and 14. These sections are joined together by a plurality of bolts 16. In use, a ring gear (not shown) is affixed of the case flange 18 with bolts inserted through openings 20 which extend therethrough. The ring gear is meshed with a pinion gear (not shown) positioned in the differential carrier (not shown). The pinion gear is rotated through the drive line of the vehicle, by the engine and transmission. Rotation of the pinion gear causes rotation of the ring gear and differential case 10.

The differential case 10 forms a driving element and has a plurality of openings 22, 24, 26 and 28 intermediate the ends of the differential case 10 and extending into the periphery thereof. These openings are in spaced relationship. The first pair of openings 22 and 24 have cam walls which converge in one direction, while the second pair of openings 26 and 28 have cam walls which converge in the opposite direction. The opening 22 in the differential case 10 has two converging cam walls 32 and 34 which usually have an included angle of approximately 90 to 120 degrees (FIG. 3), while diametrically opposite opening 22 is the second opening 24. As previously stated, both openings 22 and 24 have similar configurations and cam walls converging in the same direction. Openings 26 and 28 are displaced 90 degrees from openings 22 and 24 and have opposed converging cam walls 36 and 38 (FIG. 4) in the differential case 10. The included angle between the faces of cam walls 36 and 38 is also approximately 90 to 120 degrees as in the first instance thereby making the included angle equal in all openings. Although many and various angles may be used successfully, the stated range of angles has been found by test to be suitable.

A two part generally C-shaped spider pin assembly 40 is provided inside the differential case 10. The stub shafts 42 and 44 of the first section of the spider pin assembly 40 are generally round and have cam faces 46 and 48 on the outer ends thereof. Cam faces 46 and 48 are so located and positioned on the spider pin as to engage the convergent cam walls 32 and 34 of openings 22 and 24 in the case. The stub shafts 52 and 54 of the second C-shaped section of the spider pin assembly 40 are generally round and have cam faces 56 and 58 on the outer ends thereof. Cam faces 56 and 58 are so located and positioned as to engage the cam walls 36 and 38 of openings 26 and 28 in the differential case 10. Both cam faces 46 and 48 on the first spider pin section are similar in shape and converge in the same direction, while cam faces 56 and 58 on the second section of the spider pin converge in the opposite direction. Differential pinions 62, 64, 66 and 68 are positioned on the end portions of the spider pin assemblies so as to be in rotational engagement with the side gears 110 and 112. The stub shafts 42 and 44 of the first spider pin sections have pinions 62 and 64 positioned thereon, while the stub shafts 52 and 54 of the second spider pin section have pinions 66 and 68 positioned thereon.

The pinions 62, 64, 66 and 68 are provided with extending hub portions 72, 74, 76 and 78. The generally vertical side edges 82, 84, 86 and 88 of hubs 72, 74, 76 and 78 are adapted to frictionally engage the generally vertical edges 106 and 108 of driving cup members 102 and 104 which house the side gears 110 and 112. As the differential case assembly 10 is rotated, through the ring gear and drive line (not shown), the side gears 110 and 112 transfer the power from the differential case assembly 10 to the axle shafts (not shown). The side gears 110 and 112 have machined therein splined hub portions 114 and 116. These splined hub portions 114 and 116 are disposed in slidable engagement with the splined portions of the axle shafts (not shown). The driving cups 102 and 104 have splined hub sections 115 and 117 which are similar to and in alignment with the splines 114 and 116 in the side gears.

A second pair of cup members termed locking cups 120 and 122, without splines, are slideably positioned at each end of the differential case assembly 10. A plurality of outwardly extending finger members 124 on the locking cup 120 engages a plurality of notches 125 in the case. This construction prevents rotation of the cup 120 relative to the differential case 10. The inner surface 130 of locking cup 120 is conical in shape and is adapted to receive the conical outer surface 98 of driving cup 102. The second locking cup 122 includes a plurality of fingers 126 which engage a plurality of notches 127 in the differential case 10. The inner surface 132 of cup 122 is adapted to engage the outer surface 100 of cup 104. Several lubrication holes 135 (shown in phantom) are circumferentially located in each of the driving cups 102 and 104. These holes provide adequate lubrication for the locking surfaces 98, 100, 130 and 132, when such lubrication is needed. The lubrication holes run from a point adjacent the teeth on the side gears 110 and 112 to the tapered locking surfaces 98 and 100. The driving cups 102 and 104 have channel grooves 136 and 138 on the inner periphery thereof and at the root diameter of the side gear teeth. These grooves connect the lubrication holes in the driving cups with the tapered locking surfaces. By means of this construction, lubricant is permitted to be passed through the channel grooves at all times, even though a tooth on the side gear is opposite one of the several lubrication holes. As the bevel gear teeth on the side gears 110 and 112 mesh with the teeth on the pinions 62, 64, 66 and 68, oil under pressure lubricates the locking surfaces 98 and 100.

A very important feature of the invention will now be described. Interposed between the driving cups 102 and locking cups 120 is a friction ring 140 and a Belleville washer 142. The friction ring 140 is positioned so as to be in engagement with the rear, generally vertical, face of the driving cup 102. The Belleville washer 142 is in contact with both the inside face of locking cup 120 and one face of the friction ring 140. With respect to the other driving cup 104, a similar condition exists. A friction ring 144 is in engagement with the generally vertical, rear face of driving cup 104, while the Belleville washer 146 is in engagement with the inside face of locking cup 122 and the outside face of the friction ring 144.

The friction rings 140 and 144 may be provided in various thicknesses when the unit is being assembled. Thus, if different Belleville washers from a supply have varying characteristics of resilience, a pre-selected pressure condition can be fulfilled by choosing a friction ring of proper thickness.

Shims 150 and 152 may be provided between the locking cups 120 and 122 and the case 10. These shims are selected for the desired thickness to position the spider pin stub shafts with respect to the adjacent cam faces in the differential case.

*Operation*

When starting under power from a standing position transmission of power from the engine to the wheels is necessitated. Power is transmitted through the usual drive shaft, pinion and ring gear to the differential case assembly 10. As the differential case 10 is rotated, the cam wall 34 of opening 24 (FIG. 3) is moved against the cam face 48 of spider pin stub shaft 44. As the cam face 48 of the stub shaft 44 moves backward along the cam wall 34 of case 10, a component of movement to the left occurs as indicated by the arrow "A." Since the spider is symmetrical, the opposite end or stub shaft 42 (FIG. 1) of the spider section moves in the same manner. The differential pinions 62 and 64 are carried on spider pin stub shafts 42 and 44 to the left, toward the side gear 110. The sidewise movement is transferred from the differential pinions 62 and 64 to the driving cup 102 through the engagement of the vertical edges of pinion hubs 72 and 74 with the generally vertical edges 106 of the driving cup 102. This construction eliminates the possibility of the gear teeth scoring. The side gear 110 is also moved to the left along the splined axle shaft (not shown) which permits engagement of the tapered friction faces 98 and 130. In this position the differential case 10 is directly connected to side gear 110 through driving cup 102, friction surfaces 98 and 130, and locking cup 120.

As the driving member or differential case assembly 10 is rotated as explained above, the second section of the spider pin assembly which carries stub shafts 52 and 54 is moved to the right as demonstrated in connection with the illustration shown in FIG. 4. The cam wall 38 in the driving member or differential case 10 is moved against the cam face 58 of the spider pin stub shaft 54. As the spider pin stub shaft 54 is moved along cam face 38 to the position indicated in FIG. 4, there is a component of movement to the right in the direction of arrow "B." Since the spider pin stub shaft 52 is constructed in the same manner as spider pin stub shaft 54 and affixed thereto through a C-shaped assembly 40, the spider pin stub shaft 52 will be moved to the right in the same manner. The differential pinions 66 and 68, which are carried on the spider pin stub shafts 52 and 54 are also moved to the right toward side gear 112. The sidewise movement is transferred from the differential pinions to the driving cup 104 through the generally vertical track portions 86 and 88 on pinion gears 66 and 68 and the generally vertical track portion 108 on the driving cup 104. The side gear 112 is moved to the right along its splined engagement (not shown) so as to engage driving cup 104. The clutch face 100 adjoining driving cup 104 is forced against the locking surface 132 provided in locking cup 122 in the differential case 10. In this position power is transferred from the driving member or differential case 10 through locking cup 122 to the driving cup 104 and side gear 112 through the conical clutch face 100 and locking surfaces 132 rather than through the differential pinions.

Thus, as the driving member or differential case 10 is rotated, half of the spider pin assembly 40 moves to the left to lock side gear 110 to the driving member or case 10 and the remaining section of the spider pin assembly moves to the right to lock side gear 112 to the differential case 10. In this position of the differential there is a complete lock, and torque is effectively distributed to both wheels. One wheel cannot spin relative to the other, so that there is no problem when one wheel is obstructed or when the wheels are on a slippery surface.

When the vehicle is in reverse, the differential works in a similar manner although opposite in direction. The only difference is that the opposite cam walls and cam faces are brought into play.

When differential action is required, as when the vehicle turns a corner and one wheel rotates faster than the other, the essence of the present invention is brought into play. Differential action is provided simply and automatically by the construction of the present invention. If the vehicle is making a right turn, the left wheel tends to advance and increase the rotational speed. This tendency or force is transmitted through the axle shaft (not shown) to the left side gear 110. The side gear 110 has a tendency to move in opposition to the lock between the locking surface 130 of the locking cup 120 (which is affixed to the case 10) and the clutch face 98 on driving cup 102 (splined to axle shaft). This force is exerted against the pinion hub portions 72 and 74 and the side gear track portion 106, as well as between the meshed teeth of the differential pinions 62 and 64 and the side gear 110. This force is transferred through the differential pinions to the spider pin stub shafts 42 and 44, and moves the stub shafts a very short distance back along the cam walls of the case. The Belleville washer 142 then exerts its pressure to separate driving cup 102 from locking cup 120.

In this position, the lock between conical clutch face 98 of driving cup 102 and the locking surface 130 of the cup 120 is broken and the locking surface 130 of locking cup 120 slips relative to the clutch face 98 on driving cup 102. The drive is then through the spider pin stub shafts 42 and 44 and pinion gears 62 and 64 to the side gear 110.

If a left turn is executed, the spider pin stub shafts 52 and 54 are moved to release and lock between locking portions 132 and 100 of driving cup 104 and locking cup 122.

The rotation of one side gear at a rate greater than the rate of rotation of the driving member or differential case 10, results in unlocking the unit. Thus, in either right or left turns, the advancing side gear unlocks the device.

The neutral or unlocked position of the unit includes a condition whereby a small pre-load is present. This pre-load is accomplished by the resilient Belleville washers 142 and 146 exerting a spreading pressure between the locking cups 120 and 122 and the driving cups 102 and 104. The backs of the locking cups 120 and 122 are held into engagement with the ends of the differential case 10, and a pre-load is effected which will energize the unit to a condition of slight pressure under conditions of very low traction in straight ahead driving.

It will be apparent to one skilled in the art that this invention can be applied to other mechanisms with changing or unequal torque on the wheels, gears or other rotational members.

Having thus described my invention, I claim:

1. A locking differential power transmission for use with a power source comprising, a rotatable case adapted to be rotated about an axis; a pair of side gears one mounted at each side of said case for rotation relative thereto; a spider means disposed in said case; a plurality of pinion gears rotatably disposed on said spider means, the teeth of said pinion gears being in mesh with the teeth of said side gears; inter-engaging cam means connecting said spider means to said case, and operative upon relative rotation of the spider means and case about said axis to provide a force parallel to said axis; a pair of locking members one disposed at each side of said case outward of said side gear and rotatable with said case; a first clutch surface on each of said locking members; a pair of driving members one disposed between each side gear and the adjacent locking member, and adapted to be affixed to a driven shaft; a second clutch surface on each of said driving members; the application of power from said power source causing said inter-engaging cam means to move said first and second clutch surfaces into engagement and lock the device in straight ahead movement; and a pair of resilient members one disposed between each locking member and the adjacent driving member; said resilient members exerting an energizing pre-load between the driving member and the locking member apart from the clutch faces to provide a quick limited lock when the unit is not differentialing; and which resilient members also assist in unlocking the lock provided through the engaged clutch surfaces when said side gears rotate at a speed of rotation different than the speed of rotation of the case.

2. A locking differential power transmission as defined in claim 1 wherein a friction ring is inserted between at least one of the locking members and the adjacent driving member, said friction ring being of sufficient thickness to provide a predetermined pressure with said resilient members.

3. A locking differential power transmission for use with a power source comprising, a rotatable case adapted to be rotated about an axis; a pair of side gears one mounted at each side of said case for rotation relative thereto; a spider disposed in said case; a plurality of spider pins extending outwardly from said spider; a plurality of pinion gears one rotatably disposed on each of said spider pins, the teeth of said pinion gears being in mesh with the teeth of said side gears; inter-engaging cam means connecting said spider means to said case, and operative upon relative rotation of the spider and case about said axis to provide a force parallel to said axis; a pair of locking cups one disposed at each side of said case outward of said side gear and rotatable with said case; a first clutch surface on each of said locking cups; a pair of driving cups one positioned between each side gear and the adjacent locking cup, and adapted to be affixed to a driven shaft; a second clutch surface on each of said driving cups; the application of power from said power source causing said inter-engaging cam means to move said first and second clutch surfaces into engagement and lock the device in straight ahead movement; and a pair of resilient members one disposed between each locking cup and the adjacent driving cup; said resilient members exerting an energizing pre-load between the driving cup and the locking cup apart from the clutch faces to provide a quick limited lock when the unit is not differentialing; and which resilient members also assist in unlocking the lock provided through the engaged clutch surfaces when said side gears rotate at a speed of rotation different than the speed of rotation of the case.

References Cited in the file of this patent

UNITED STATES PATENTS

| 1,867,678 | Rayburn | July 19, 1932 |
| 1,917,999 | Spear | July 11, 1933 |
| 2,217,357 | Coe | Oct. 8, 1940 |
| 2,431,272 | Mynssen et al | Nov. 18, 1947 |
| 2,771,977 | Uher | Nov. 27, 1956 |
| 2,778,246 | Thornton | Jan. 27, 1957 |
| 2,855,806 | Fallon | Oct. 14, 1958 |

FOREIGN PATENTS

| 1,102,679 | France | Dec. 11, 1955 |
| 788,105 | Great Britain | Dec. 23, 1957 |

OTHER REFERENCES

"Differential with a Difference," Motor, January 1956, pp. 24, 25 and 170 (copy in Scientific Library and Div. 12).